(12) United States Patent
Dhawan et al.

(10) Patent No.: US 12,305,130 B2
(45) Date of Patent: May 20, 2025

(54) ASPHALTENE AND PARAFFIN DISPERSANT COMPOSITIONS AND USES THEREOF

(71) Applicant: ECOLAB USA INC., St. Paul, MN (US)

(72) Inventors: Ashish Dhawan, Aurora, IL (US); Regan Andrew Jones, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 17/722,698

(22) Filed: Apr. 18, 2022

(65) Prior Publication Data

US 2022/0364002 A1    Nov. 17, 2022

Related U.S. Application Data

(60) Provisional application No. 63/177,661, filed on Apr. 21, 2021.

(51) Int. Cl.
*C10G 75/04* (2006.01)

(52) U.S. Cl.
CPC ....... *C10G 75/04* (2013.01); *C10G 2300/206* (2013.01); *C10G 2300/208* (2013.01); *C10G 2300/44* (2013.01)

(58) Field of Classification Search
CPC ........ C10G 75/00; C10G 75/02; C10G 75/04; C10G 2300/206; C10G 2300/208; C10G 2300/44; C09K 8/524
See application file for complete search history.

(56) References Cited

U.S. PATENT DOCUMENTS

| | | | |
|---|---|---|---|
| 3,471,458 A * | 10/1969 | Mehmedbasich | C08F 8/00 526/263 |
| 3,476,686 A * | 11/1969 | Carrow | C10M 159/12 508/240 |
| 3,651,028 A | 3/1972 | Kenichi et al. | |
| 3,929,632 A | 12/1975 | Buriks et al. | |
| 4,102,798 A | 7/1978 | Ryer et al. | |
| 4,391,721 A * | 7/1983 | Pappas | C10M 149/04 508/249 |
| 4,707,285 A * | 11/1987 | Brewster | C10M 143/02 508/241 |
| 4,740,561 A | 4/1988 | Tsujimoto et al. | |
| 4,892,567 A | 1/1990 | Yan | |
| 5,017,299 A | 5/1991 | Gutierrez et al. | |
| 5,110,997 A * | 5/1992 | Dickakian | C07C 17/42 570/103 |
| 5,214,224 A | 5/1993 | Comer et al. | |
| 5,219,480 A * | 6/1993 | Gutierrez | C10M 133/04 508/553 |
| 5,427,690 A | 6/1995 | Rowe et al. | |
| 5,705,603 A * | 1/1998 | Krull | C10L 1/143 528/336 |
| 5,756,428 A | 5/1998 | Emert et al. | |
| 5,882,506 A | 3/1999 | Ohsol et al. | |
| 6,015,863 A | 1/2000 | Mike et al. | |
| 6,107,450 A | 8/2000 | Harrison et al. | |
| 6,548,458 B2 | 4/2003 | Loper | |
| 6,946,524 B2 | 9/2005 | Breuer et al. | |
| 7,067,599 B2 | 6/2006 | Tack et al. | |
| 8,067,347 B2 | 11/2011 | Ruhe, Jr. et al. | |
| 8,980,804 B2 | 3/2015 | Loper et al. | |
| 9,085,737 B2 | 7/2015 | Yeganeh et al. | |
| 9,181,510 B2 | 11/2015 | Barton et al. | |
| 9,663,744 B2 | 5/2017 | Zhang et al. | |
| 10,006,276 B1 | 6/2018 | Lawson et al. | |
| 10,006,277 B1 | 6/2018 | Lawson et al. | |
| 10,082,010 B1 | 9/2018 | Lawson et al. | |
| 10,087,732 B1 | 10/2018 | Lawson et al. | |
| 10,113,101 B2 | 10/2018 | Soriano, Jr. et al. | |
| 10,125,590 B1 | 11/2018 | Lawson et al. | |
| 10,180,052 B1 | 1/2019 | Lawson et al. | |
| 10,190,061 B1 | 1/2019 | Lawson et al. | |
| 10,202,832 B1 | 2/2019 | Lawson et al. | |
| 10,215,006 B1 | 2/2019 | Lawson et al. | |
| 10,233,273 B2 | 3/2019 | Kundu et al. | |
| 10,260,008 B1 | 4/2019 | Lawson et al. | |
| 10,260,326 B1 | 4/2019 | Lawson et al. | |

(Continued)

FOREIGN PATENT DOCUMENTS

| | | |
|---|---|---|
| CA | 2075749 C | 11/2004 |
| EP | 0815150 B1 | 12/1999 |

(Continued)

OTHER PUBLICATIONS

Wang, Jingang. (2006). Application of high-efficiency emulsion breaker ERI1160 in electro-static desalter. Shiyou Huagong Fushi Yu Fanghu. 23. 33-34.

Wang, Ping & Liang, Chao. (2013). Research on the Demulsifier and Decalcifying Agent for Crude Oils in Electric Desalting Process. Applied Mechanics and Materials. 475-476. 1289-1293. 10.4028/www.scientific.net/AMM.475-476.1289.

Wu, Fei-yue. (2012). Research on high acid heavy crude oil electric desalting and dewatering technology. Huaiyin Shifan Xueyuan Xuebao. 11. 375-379.

Wu, Feiyue. (2012). Study on the divided-wall electric desalting technology for Suizhong crude oil. Desalination. 307. 20-25.

(Continued)

*Primary Examiner* — Michelle Stein

(74) *Attorney, Agent, or Firm* — Eric D. Babych; Barnes & Thornburg LLP

(57) ABSTRACT

The present disclosure relates to methods and compositions for reducing fouling by natural and synthetic foulants that tend to precipitate during hydrocarbon collecting, processing, transporting, and storing. The method includes applying a composition to a hydrocarbon containing the foulant. The composition includes an effective amount of a reaction product of an α-olefin/maleic anhydride copolymer and an amino-hydroxy compound. The foulants may include wax and asphaltenes, for example.

20 Claims, No Drawings

(56) References Cited

U.S. PATENT DOCUMENTS

| | | | |
|---|---|---|---|
| 10,273,418 B1 | 4/2019 | Lawson et al. | |
| 10,280,374 B1 | 5/2019 | Lawson et al. | |
| 10,280,375 B1 | 5/2019 | Lawson et al. | |
| 10,294,429 B1 | 5/2019 | Lawson et al. | |
| 10,899,989 B2 | 1/2021 | Jiang et al. | |
| 2003/0166811 A1* | 9/2003 | Peiffer | C10L 1/2368 526/272 |
| 2003/0217971 A1 | 11/2003 | Varadaraj et al. | |
| 2004/0139931 A1* | 7/2004 | Duncan | C10L 1/328 123/25 A |
| 2004/0266973 A1 | 12/2004 | Strickland et al. | |
| 2005/0000862 A1* | 1/2005 | Stark | C10L 1/1966 208/254 H |
| 2006/0036057 A1 | 2/2006 | Lang | |
| 2007/0111903 A1 | 5/2007 | Engel et al. | |
| 2007/0276052 A1 | 11/2007 | Varadaraj | |
| 2008/0187665 A1* | 8/2008 | Banning | C09D 11/34 427/256 |
| 2009/0133577 A1 | 5/2009 | Falkiiner et al. | |
| 2010/0089797 A1 | 4/2010 | Chakka et al. | |
| 2010/0140141 A1 | 6/2010 | Cendejas Santana et al. | |
| 2010/0234247 A1 | 9/2010 | Varadaraj | |
| 2010/0276375 A1 | 11/2010 | Sams | |
| 2011/0068049 A1 | 3/2011 | Garcia, III et al. | |
| 2012/0024758 A1 | 2/2012 | Love | |
| 2012/0181218 A1 | 7/2012 | Chakka et al. | |
| 2012/0212729 A1 | 8/2012 | Hart et al. | |
| 2012/0255886 A1 | 10/2012 | Flores Oropeza et al. | |
| 2012/0261312 A1 | 10/2012 | Flores Oropeza et al. | |
| 2013/0043192 A1 | 2/2013 | Smith et al. | |
| 2013/0048542 A1 | 2/2013 | Hamad et al. | |
| 2013/0299390 A1 | 11/2013 | Koczo et al. | |
| 2014/0131254 A1 | 5/2014 | Soliman | |
| 2014/0202929 A1 | 7/2014 | Mason et al. | |
| 2014/0213668 A1 | 7/2014 | Meyer | |
| 2014/0238900 A1 | 8/2014 | Flores Oropeza et al. | |
| 2014/0238901 A1 | 8/2014 | Flores Oropeza et al. | |
| 2014/0262952 A1 | 9/2014 | Yeganeh et al. | |
| 2014/0275663 A1* | 9/2014 | Brons | C10G 75/04 73/152.33 |
| 2014/0317998 A1 | 10/2014 | Metcalfe et al. | |
| 2014/0323789 A1 | 10/2014 | Wines | |
| 2014/0353214 A1 | 12/2014 | Daage et al. | |
| 2015/0087729 A1 | 3/2015 | Flores Oropeza et al. | |
| 2015/0175904 A1 | 6/2015 | Yeganeh et al. | |
| 2015/0175905 A1 | 6/2015 | Love | |
| 2015/0315487 A1 | 11/2015 | Yeganeh et al. | |
| 2016/0097004 A1 | 4/2016 | Adamski et al. | |
| 2016/0208176 A1 | 7/2016 | Barroeta et al. | |
| 2016/0222305 A1* | 8/2016 | Mo | C07C 7/14875 |
| 2017/0037324 A1 | 2/2017 | Daage et al. | |
| 2017/0044445 A1 | 2/2017 | Soliman | |
| 2017/0313949 A1 | 11/2017 | Flores Oropeza et al. | |
| 2017/0327686 A1 | 11/2017 | Flores Oropeza et al. | |
| 2018/0002613 A1 | 1/2018 | Garcia, III et al. | |
| 2018/0119031 A1 | 5/2018 | Haworth et al. | |
| 2018/0155644 A1 | 6/2018 | Sawhney et al. | |
| 2018/0195010 A1 | 7/2018 | Salu et al. | |
| 2019/0153335 A1 | 5/2019 | Lawson et al. | |
| 2019/0153835 A1 | 5/2019 | Lawson et al. | |
| 2019/0153837 A1 | 5/2019 | Lawson et al. | |
| 2019/0153838 A1 | 5/2019 | Lawson et al. | |
| 2019/0153839 A1 | 5/2019 | Lawson et al. | |
| 2019/0202962 A1 | 7/2019 | Braden et al. | |
| 2019/0211273 A1 | 7/2019 | Barroeta et al. | |
| 2022/0364000 A1* | 11/2022 | Dhawan | C02F 1/56 |

FOREIGN PATENT DOCUMENTS

| | | |
|---|---|---|
| EP | 3194538 A1 | 7/2017 |
| GB | 1258650 A | 12/1971 |
| GB | 1526788 A | 9/1978 |
| WO | 2000050540 A1 | 8/2000 |
| WO | 2000050541 A1 | 8/2000 |
| WO | 2004020553 A1 | 3/2004 |
| WO | 2009062312 A1 | 5/2009 |
| WO | 2010008911 A2 | 1/2010 |
| WO | 2019013799 A1 | 1/2019 |
| WO | 2019089043 A1 | 5/2019 |

OTHER PUBLICATIONS

Xu, Weixiang. (2014). Influential factors of lower freezing point heavy crude oil electrical desalting and analysis of operating process parameters. Shanghai Huagong. 39. 7-10.

Yao, Fei. (2014). Application of ultrasonic emulsion breaking technology in electrostatic desalting process. Guangdong Huagong. 41. 78-79.

Yu, Xiao-ai. (2014). Research on crude oil electric desalting and dewatering in Tianjin. Huaxue Gongchengshi. 28. 39-42.

Yu, Yanqiu. (2006). Application of new squirrel type oil condensate electric desalting. Shiyou Huagong Fushi Yu Fanghu. 23. 30-32.

Zhang, Fenghua. (2011). Study on electric desalting process for highly conductive high TAN crude oil. Lianyou Jishu Yu Gongcheng. 41. 5-8.

Zhang, Fenghua. (2013). Research progress on electro-desalting technology of crude oil. Huagong Keji. 21. 71-74.

Zhang, Yongsheng. (2011). Study on electrodesalting for highly acidic crude oil. Shihua Jishu Yu Yingyong. 29. 320-323.

Zhao, Mao. (2014). Analyze and advise of overproof in Tahe crude oil electric desalting. Shiyou Huagong Yingyong. 33. 89-91.

Zhao, Mao. (2014). Screening of additives for electro-desalting of Tahe crude oil and optimization of process conditions. Lianyou Jishu Yu Gongcheng. 44. 57-60.

Zhao, Quan-ming. (2013). Optimal operation of electric desalting system. Liaoning Huagong. 42. 248-249.

Zheng, Junhe. (2010). Study on desalting technology for Saudi mixed crude oil. Lianyou Jishu Yu Gongcheng. 40. 1-4.

Zheng, Mengzhu. (2014). Study and optimization of process conditions of electric desalination for high-TAN extra-heavy crude oil. Lianyou Jishu Yu Gongcheng. 44. 1-4.

Abdel-Azim, A.-A., Nasser, A., Ahmed, N., & S. Kamal, R. (Jan. 2011). Multifunctional Lube Oil Additives Based on Octadecene-Maleic Anhydride Copolymer. Petroleum Science and Technology, 29, 97-107. doi:10.1080/10916460903069829.

Johnson Olufemi Adebayo, Affam Augustine Chioma. (2019). Petroleum sludge treatment and disposal: A review. Environmental Engineering Research, 24(2), 191-201. doi: 10.4491/eer.2018.134.

Zhou Jian, Wang Jian. (2006). Characteristics of YFJ332 Thermal Reflection Heat Insulation Corrosion-resistant Coating and Application. Corrosion & Protection in Petrochemical Industry, 23(3), 42-44.

PCT International Search Report and Written Opinion for PCT/US2022/025203, mailed Jul. 1, 2022, 11 pages.

PCT International Search Report and Written Opinion for PCT/US2022/025215, mailed Jul. 6, 2022, 9 pages.

Xu, Jun et al. "How comb-type poly(maleic acid alkylamide-co-alpha-olefin) assemble in waxy oils and improve flowing ability," Asia-Pacific Journal of Chemical Engineering (2009) 4, 551-556.

Atta, Ayman M. (2013). Electric desalting and dewatering of crude oil emulsion based on Schiff base polymers as demulsifier. International Journal of Electrochemical Science. 8. 9474-9498.

Chen, Mingyan. (2011). Influential factors analysis of heavy crude oil electrical desalting and optimization research of operation conditions. Shiyou Yu Tianranqi Huagong. 40. 578-580.

Chen, Mingyan. (2011). Research advances in demulsifiers for electric desalting in refinery. Jingxi Shiyou Huagong Jinzhan. 12. 51-54.

Ding, Qiu-wei. (2014). The study on electric desalting demulsifier. Tianjin Huagong. 28. 27-29.

Fan, Yu-xin. (2016). Impact of salts and high-frequency pulsed electric field parameters on water chain formation. Gaoxiao Huaxue Gongcheng Xuebao. 30. 364-370.

Feng, Rusen. (2005). Design and application of an effective emulsion breaker CYZ-L-4 in oil refinery. Shiyou Yu Tianranqi Huagong. 34. 384-386.

(56) References Cited

OTHER PUBLICATIONS

Gao, Hongli. (2013). Performance analysis and improvement measurement for electro-desalting of crude oil with high-salt and high-water content. Shiyou Yu Tianranqi Huagong. 42. 18-21.
Goldhammer, Brett P. (2010). Recent development in crude blending, treating, and desalting. Zhongwai Nengyuan. 15. 67-71.
Gou, Shequan. (2010). The application of two-stage ultrasonic-electrical combined desalting technology. Shiyou Lianzhi Yu Huagong. 41. 19-23.
Han, Lei. (2014). Application of oil soluble demulsifier in crude oil electrical desalting and dewatering. Dangdai Huagong. 43. 348-349.
Han, Lei. (2014). Optimization of operation of electro-static desalting for processing high-TAN crude oil. Shiyou Huagong Fushi Yu Fanghu. 31. 34-37.
He, Zhiqiang. (2009). Selection of electro-desalting technologies for mixed refining poor-quality acid heavy crude oil. Zhongwai Nengyuan. 14. 74-77.
Hou, Xia. (2006). Factor analysis about the desalting efficiency affecting the electric desalting and dewatering device and improvement opinions. Shiyou Huagong Yingyong. 25. 37-40.
Hou, Yanchao. (2011). Experimental study on the performance of MPTT decalcification additive for crude oil. Lianyou Jishu Yu Gongcheng. 41. 54-57.
Islam, Badrul. (2015). Petroleum sludge, its treatment and disposal: A review. 13. 1584-1602.
Jiang, Zhenhai. (2007). Corrosion prevention technique for sulfur-rich petroleum processing. Huagong Zhuangbei Jishu. 28. 74-75.
Jing, Junhang. (2014). Application of a new type of oil soluble demulsifier for crude oil. Sichuan Huagong. 17. 20-22.
Koshelev, V. N. (2000). New demulsifiers for petroleum preparation processes. Chemistry and Technology of Fuels and Oils. 36. 97-100.
Kumar, Sunil. (2008). Role of demulsifier in crude desalting. Acta Ciencia Indica, Physics. 34. 447-452.
Li, Bengao. (2012). New progress of chemical anticorrosion technology for units processing high acid crude oil. Shiyou Lianzhi Yu Huagong. 43. 82-86.
Li, Haoliang. (2008). Revamp of electric desalter for processing low-quality crude oil. Lianyou Jishu Yu Gongcheng. 38. 21-24.
Li, Long. (2013). Removal of nickel and vanadium from Tahe crude oil by using DTC-CTS. Shiyou Xuebao. 29. 318-324.
Li, Qingmei. (2009). Research on decreasing electric current in electric desalting. Lianyou Jishu Yu Gongcheng. 39. 19-21.
Li, Qingmei. (2011). Assessment of kazakhstan oil demulsifier and optimization of electric desalting process. Shiyou Huagong Sheji. 28. 30-31, 34.
Li, Qingsong. (2005). Selection of crude oil electrical desalting deemulsifier and application of EC2425A oil soluble deemulsifier. Lianyou Jishu Yu Gongcheng. 35. 49-51.
Li, Xiao-guang. (2016). Optimization of electric desalting operating conditions. Anhui Huagong. 42. 52-54.
Li, Xuekun. (2013). Optimization for electrochemical dehydration process of coal tar using response surface methodology. Shiyou Huagong. 42. 1123-1129.
Li, Ying. (2013). Industry application of ultrasonic-pulse transformer electrical desalting technology. Guangzhou Huagong. 41. 176-178.
Liang, Binhua. (2006). Processing Doba crude oil containing high acid number and high calcium. Shiyou Lianzhi Yu Huagong. 37. 12-16.
Lin, Chian-chen. (2000). De-emulsification of crude oil. Jiemian Kexue Huizhi. 22. 39-45.
Liu, Hong-wei. (2012). Application of ultrasonic technology to northern Shaanxi mixed crude oil desalting. Huaxue Gongcheng. 40. 74-78.
Liu, Jiaguo. (2006). Electric desalting technology of Tahe crude oil. Shiyou Huagong Sheji. 23. 18-20.
Liu, Tonghua. (2005). Problems and countermeasures in processing Doba crude. Lianyou Jishu Yu Gongcheng. 35. 6-11.
Liu, Yucheng. (2013). Synthesis and evaluation of demulsifier for heavy crude oil electrical desalting. Shiyou Xuebao, Shiyou Jiagong. 29. 1083-1089.
Lou, Shisong. (2006). Dehydration of Shengli crude oil. Shiyou Huagong Fushi Yu Fanghu. 23. 8-12.
Lou, Shisong. (2006). Elec. desalting process for highly conductive crude oil. Shiyou Huagong Sheji. 23. 31-33.
Lou, Shisong. (2007). Research on desalination technology and application of Russian mixed crude oil. Lianyou Jishu Yu Gongcheng. 37. 14-17.
Ma, Baoli. (2012). Evaluation of demulsifiers for demulsification/dehydration of Venezuela heavy crude oil and optimizing electrical desalting operation conditions. Shiyou Lianzhi Yu Huagong. 43. 98-102.
Peng, Songzi. (2012). Selection of additives for Tahe crude electrostatic desalting and process optimization. Shiyou Huagong Fushi Yu Fanghu. 29. 14-16.
Qu, Xi-shuang. (2011). Process operation of electric desalting for heavy oil. Liaoning Huagong. 40. 833-835.
Ren, Jiansong. (2011). Technology research on Liuhua crude electric-desalting. Lianyou Jishu Yu Gongcheng. 41. 10-13.
Sams, Gary W. (2000). Emulsion resolution in electrostatic processes. Energy & Fuels. 14. 31-37.
Shang, Feifei. (2012). Study on the demulsification and dehydration technology of Liaohe aged oil. Shiyou Lianzhi Yu Huagong. 43. 36-39.
Shi, Wei. (2008). Optimization of operating conditions of high-velocity electric desalting process. Lianyou Jishu Yu Gongcheng. 38. 16-18.
Sun, Pingwen. (2009). Research and application of electric desalting process on condensate oil treatment unit. Henan Huagong. 26. 38-39.
Tan, Li. (2009). Review on crude oil desalting and dehydration processes. Lianyou Jishu Yu Gongcheng. 39. 1-7.
Vafajoo, Leila. (2012). Influence of key parameters on crude oil desalting: An experimental and theoretical study. Journal of Petroleum Science & Engineering. 90-91, 107-111.
Wang, Guanchun. (2009). Application of high-speed electric desalination technology in refining Russian crude oil. Zhongwai Nengyuan. 14. 81-84.
Wang, Huiyuan. (2009). Industrial test of electric desalination by ultrasonic demulsification. Shihua Jishu Yu Yingyong. 27. 457-460.
Wang, Jigang. (2012). Selection of electro-static desalting process for high-TAN crude oil. Lianyou Jishu Yu Gongcheng. 42. 31-34.

\* cited by examiner

ASPHALTENE AND PARAFFIN DISPERSANT COMPOSITIONS AND USES THEREOF

TECHNICAL FIELD

The present disclosure generally relates to compositions and methods of dispersing foulants. More specifically, the present disclosure provides dispersant compositions, such as asphaltene dispersant compositions and wax dispersant compositions, and methods of using such compositions to treat hydrocarbons.

BACKGROUND

Hydrocarbon processing plants, from refineries to petrochemical plants, suffer from fouling as a result of deposition of hydrocarbon byproducts deposited in heat exchangers, furnaces, water recycling loops, distillation columns, vessels, lines, overheads and other processing equipment. These byproducts include a variety of hydrocarbons that may be present in crude oil as well as the byproducts of hydrocarbon refining processes. Fouling of the interior surfaces of processing equipment occurs over a period of time that may vary from months to years depending on the unit being considered.

Asphaltene deposition is a common fouling mechanism observed in refinery heat exchanger networks. Asphaltenes are naturally occurring in crude oil. Oil and petroleum fractions in transportation, refinery separation and other processing operations often contain asphaltenes. Asphaltenes are generally defined as a solubility class of polydisperse, high molecular weight hydrocarbons that are insoluble in non-polar solvents. They are soluble in liquids having a surface tension above 25 dynes/cm, such as pyridine, carbon disulfide, carbon tetrachloride and benzene; and insoluble in nonpolar liquids having a lower surface tension, such as low-boiling petroleum naphtha, petroleum ether, liquified petroleum gases (e.g., methane, ethane, propane), pentane, isopentane, hexane and the like.

Asphaltene particles are believed to exist in the form of a colloidal dispersion stabilized by other components of crude oil. These naturally occurring dispersions can be destabilized by a variety of mechanical, thermal, and chemical conditions involved in oil production and processing. Blending of incompatible crude oils may also result in destabilization of asphaltenes. This destabilization may result in asphaltene aggregation, precipitation, and eventual deposition of a tar-like residue on the processing equipment.

Asphaltenes are an acknowledged issue in hydrocarbon processing and are known to cause problems in various types of equipment where these compounds contact interior surfaces thereof. Unless dissolved and/or effectively dispersed, asphaltenes and other foulants can accumulate and precipitate upon any one or more surfaces contacted within processing equipment or storage containers, thereby causing fouling.

In addition to asphaltenes, hydrocarbons, such as crude oil, may also contain waxes. Such crude oils have a tendency to leave residue and solids (known as "remains on board") on the walls of storage and transportation vessels, such as rail cars. Excessive residues reduce the efficiency of transporting crude oil and lead to increased costs related to added downtime for cleaning of the vessel, as well as disposal of residues removed from the vessel, which increase environmental burden. While the vessels can be cleaned to remove residues/solids, this process generates hazardous waste, takes the vessel out of service during the cleaning period, and is expensive.

BRIEF SUMMARY

In some embodiments, the present disclosure provides methods of dispersing foulants in hydrocarbons. The methods may comprise adding a composition to the hydrocarbon and dispersing the foulant, wherein the composition comprises an effective amount of a reaction product of an α-olefin/maleic anhydride copolymer and an amino-hydroxy compound. In some embodiments, the reaction product comprises a structure of Formula I:

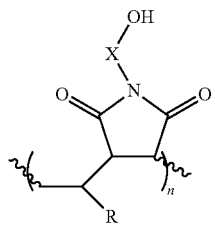

wherein R is a $C_8$ to $C_{36}$ alkyl group, n is from about 5 to about 200, and X is a linking group.

In some embodiments, X is —$CH_2$—, —$CH_2CH_2$—, —$CH_2CH_2CH_2$—, $CH_2CH(CH_3)$—, —$CH_2(CH_3)CH_2$—, —$CH_2CH_2NHCH_2CH_2$—, or —$CH_2CH_2OCH_2CH_2$—.

In certain embodiments, the amino-hydroxy compound is a cyclic aliphatic compound, an acyclic aliphatic compound, or an aromatic compound.

In some embodiments, the cyclic aliphatic compound is selected from

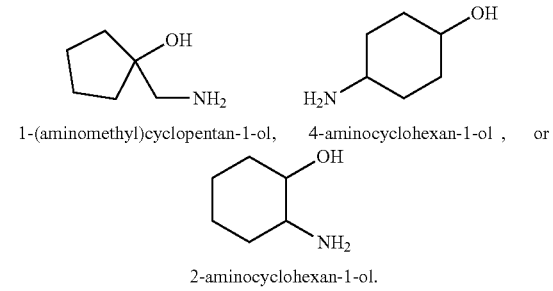

1-(aminomethyl)cyclopentan-1-ol, 4-aminocyclohexan-1-ol, or 2-aminocyclohexan-1-ol.

In some embodiments, the acyclic aliphatic compound is selected from

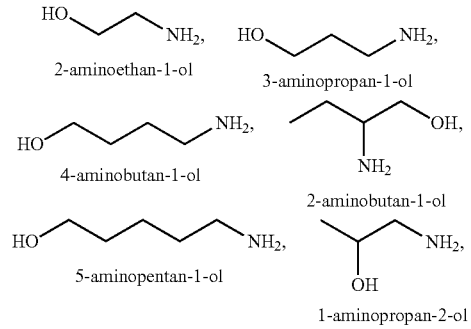

2-aminoethan-1-ol, 3-aminopropan-1-ol 4-aminobutan-1-ol, 2-aminobutan-1-ol 5-aminopentan-1-ol, 1-aminopropan-2-ol -continued

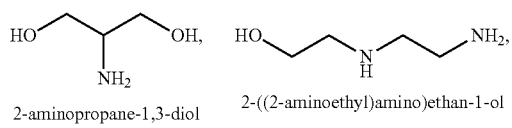

2-aminopropane-1,3-diol    2-((2-aminoethyl)amino)ethan-1-ol

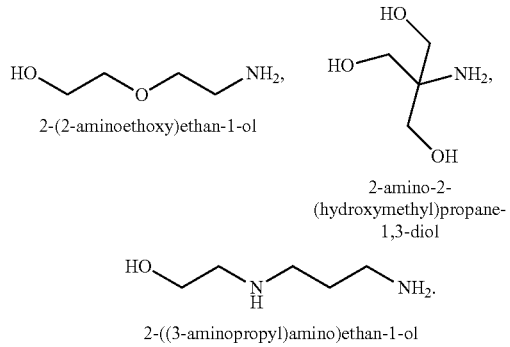

2-(2-aminoethoxy)ethan-1-ol   2-amino-2-(hydroxymethyl)propane-1,3-diol   or 2-((3-aminopropyl)amino)ethan-1-ol In some embodiments, the aromatic compound is selected from SdfF

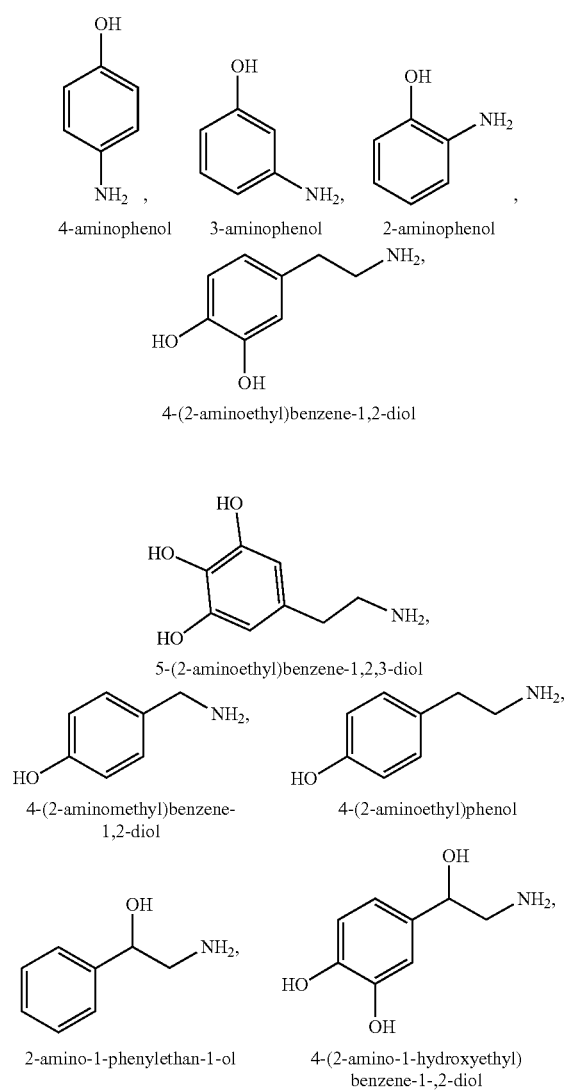

4-aminophenol   3-aminophenol   2-aminophenol 4-(2-aminoethyl)benzene-1,2-diol 5-(2-aminoethyl)benzene-1,2,3-diol 4-(2-aminomethyl)benzene-1,2-diol    4-(2-aminoethyl)phenol 2-amino-1-phenylethan-1-ol    4-(2-amino-1-hydroxyethyl)benzene-1-,2-diol

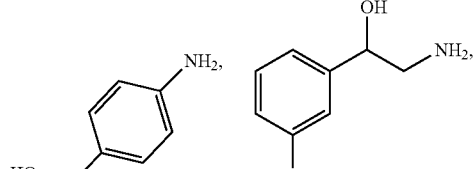

(4-aminophenyl)methanol    3-(2-amino-1-hyroxyethyl)phenol

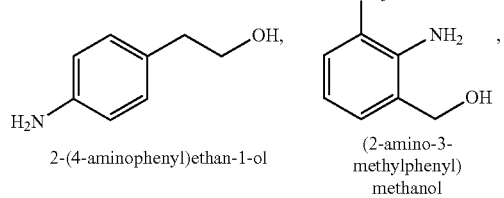

2-(4-aminophenyl)ethan-1-ol    (2-amino-3-methylphenyl)methanol

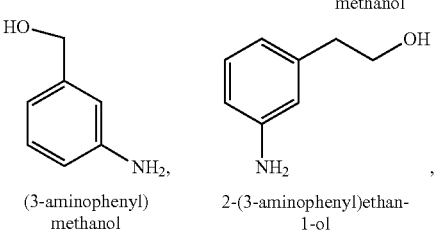

(3-aminophenyl)methanol    2-(3-aminophenyl)ethan-1-ol

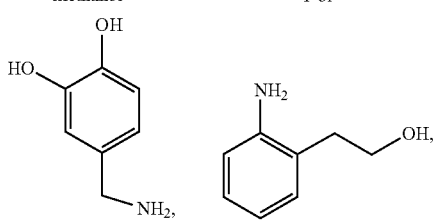

4-(aminomethyl)benzene-1,2-diol    2-(2-aminophenyl)ethan-1-ol

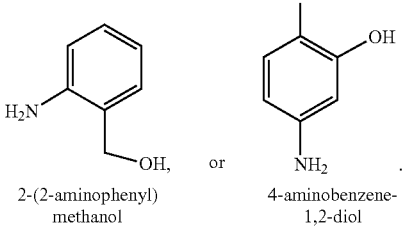

2-(2-aminophenyl)methanol    or    4-aminobenzene-1,2-diol

In certain embodiments, the foulant comprises an asphaltene and/or a wax. In some embodiments, the composition is added continuously or intermittently to the hydrocarbon. In certain embodiments, the hydrocarbon comprises crude oil.

In some embodiments, the effective amount of the reaction product is from about 1 ppm to about 10,000 ppm, based on volume of the hydrocarbon. In some embodiments, the composition comprises from about 1 wt. % to about 100 wt. % of the reaction product. In some embodiments, the reaction product comprises a weight average molecular weight from about 1,000 Da to about 100,000 Da.

In certain embodiments, the composition comprises a solvent selected from the group consisting of toluene, heavy aromatic naphtha, xylenes, a glycol, water, an alcohol, ethylene glycol, ethylene glycol monobutyl ether, kerosene, propylene carbonate, a glycol ether, and any combination thereof.

In some embodiments, the composition excludes an alkylphenol and/or an alkylphenol alkoxylate or wherein an alkylphenol and/or an alkylphenol alkoxylate is not added to the hydrocarbon.

The present disclosure also provides dispersions comprising a hydrocarbon, a reaction product of an α-olefin/maleic anhydride copolymer and an amino-hydroxy compound, a solvent, and a foulant. In certain embodiments, the dispersion comprises from about 1 ppm to about 10,000 ppm of the reaction product and from about 1 ppm to about 10,000 ppm of the solvent. In certain embodiments, the α-olefin is branched or linear.

In some embodiments, the reaction product comprises a structure of Formula I:

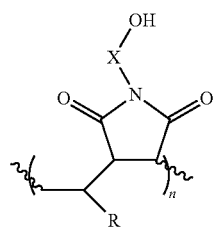

wherein R is a $C_8$ to $C_{36}$ alkyl group, n is from 5 to 200, and X is a linking group. In some embodiments, X is —$CH_2$—, —$CH_2CH_2$—, —$CH_2CH_2CH_2$—, $CH_2CH_2(CH_3)$—, —$CH_2(CH_3)CH_2$—, —$CH_2CH_2NHCH_2CH_2$— or —$CH_2CH_2OCH_2CH_2$—.

In certain embodiments, the amino-hydroxy compound is any of the cyclic aliphatic compounds, acyclic aliphatic compounds, or aromatic compound disclosed in, or contemplated by, the present disclosure.

In some embodiments, the dispersion is stable at a temperature of about 20° C. to about 400° C. In some embodiments, the hydrocarbon processing equipment comprises the dispersion. In some embodiments, the hydrocarbon comprises crude oil. In some embodiments, the reaction product comprises a weight average molecular weight from about 1,000 Da to about 100,000 Da.

In certain embodiments, the composition comprises a solvent selected from the group consisting of toluene, heavy aromatic naphtha, xylenes, a glycol, water, an alcohol, ethylene glycol, ethylene glycol monobutyl ether, kerosene, propylene carbonate, a glycol ether, and any combination thereof.

In some embodiments, the dispersion excludes an alkylphenol and/or an alkylphenol alkoxylate. In some embodiments, the reaction product does not comprise an acid group and/or the dispersion does not comprise a compound having an acid group.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

The present disclosure provides compositions and methods for treating foulants contained in hydrocarbons, such as crude oil. The methods and compositions reduce fouling by natural and synthetic foulants that tend to precipitate during hydrocarbon collecting, processing, transporting, and storing. The methods include applying compositions to hydrocarbons wherein the compositions cause a reduction in fouling and help to form a stable dispersion over a wide range of processing conditions. The compositions and methods disclosed herein are useful for inhibiting foulant precipitation and/or deposition.

As used herein, the term "foulant" means any one or more species that is present in a hydrocarbon and is capable of precipitation therefrom. Foulants include natural foulants, synthetic foulants, or combinations thereof. A "natural foulant" means any foulant species inherently present in crude oil. For example, natural foulants may include asphaltenes, waxes, heavy oil, tars, and aliphatic and aromatic hydrocarbons having a density less than that of water. A "synthetic foulant" is a foulant species that is a byproduct of hydrocarbon refining processes. Synthetic foulants may include, for example, polynuclear aromatic hydrocarbons, coke, oxidized hydrocarbons, polymers formed from polymerization of vinylic byproducts of hydrocarbon processing, such as styrene, butadiene, cyclopentadiene, and the like; and thermal decomposition products resulting from the degradation of larger molecules.

As used herein, the terms "hydrocarbon process equipment," "hydrocarbon process apparatus," and like terms mean an item having an interior surface, such as a surface comprising a metal, wherein one or more hydrocarbon products are fluidly contacted with the surface for any period of time and at any temperature. Hydrocarbon process equipment includes items for removing hydrocarbon products from a subterranean reservoir, for transporting one or more hydrocarbon products from a first location to a second location, or for separating, refining, treating, isolating, distilling, reacting, metering, heating, cooling, or containing one or more hydrocarbon products.

It has been discovered that natural and/or synthetic foulants, such as asphaltenes, present in hydrocarbon process streams can be dispersed using a composition comprising, consisting essentially of, or consisting of an effective amount of a reaction product of an α-olefin/maleic anhydride copolymer and an amino-hydroxy compound.

It has also been discovered that the compositions disclosed herein are effective in reducing wax depositions in crude oil storage and transportation vessels. Without being bound by any particular theory, it is believed that the compositions disclosed herein disperse wax, dissolve wax, and/or provide wax slippage on metal surfaces in contact with certain crude oils. These compositions may also inhibit adhesion of wax deposits onto surfaces, such as metal surfaces.

The α-olefin/maleic anhydride copolymer is copolymer of a $C_8$ to $C_{36}$ α-olefin and maleic anhydride. In some embodiments, the α-olefin is a $C_{10}$ to $C_{36}$ alkyl group, a $C_{12}$ to $C_{36}$ alkyl group, a $C_{14}$ to $C_{36}$ alkyl group, a $C_{16}$ to $C_{36}$ alkyl group, a $C_{18}$ to $C_{36}$ alkyl group, a $C_{20}$ to $C_{36}$ alkyl group, a $C_{22}$ to $C_{36}$ alkyl group, a $C_{24}$ to $C_{36}$ alkyl group, a $C_{26}$ to $C_{36}$ alkyl group, a $C_{28}$ to $C_{36}$ alkyl group, a $C_{30}$ to $C_{36}$ alkyl group, a $C_{32}$ to $C_{36}$ alkyl group, or a $C_{34}$ to $C_{36}$ alkyl group.

The alkyl group may be substituted, unsubstituted, linear and/or branched.

The α-olefin/maleic anhydride copolymer is reacted with an amino-hydroxy compound to form the foulant dispersant disclosed herein. The amino-hydroxy compound is not particularly limited and may be selected from any compound including both an amino group and a hydroxyl group.

In some embodiments, the amino-hydroxy compound is an aliphatic or cyclic aliphatic compound. For example, the amino-hydroxy compound may be selected from

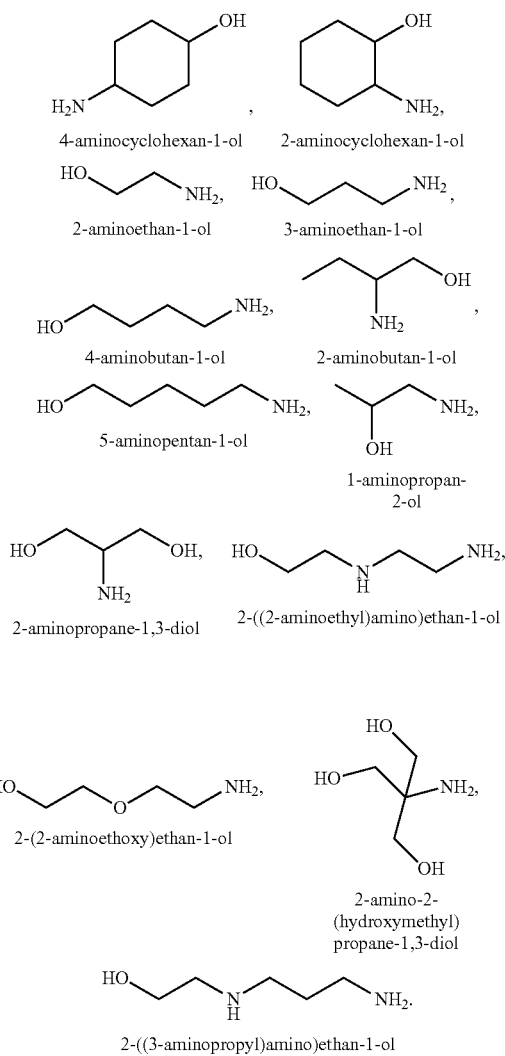

In some embodiments, the amino-hydroxy compound is an aromatic amino-hydroxy compound. For example, the amino-hydroxy compound may be selected from

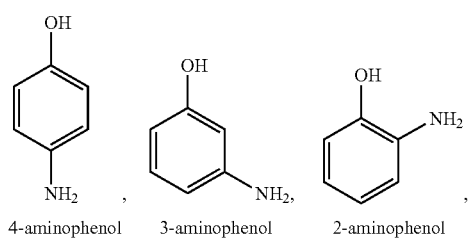

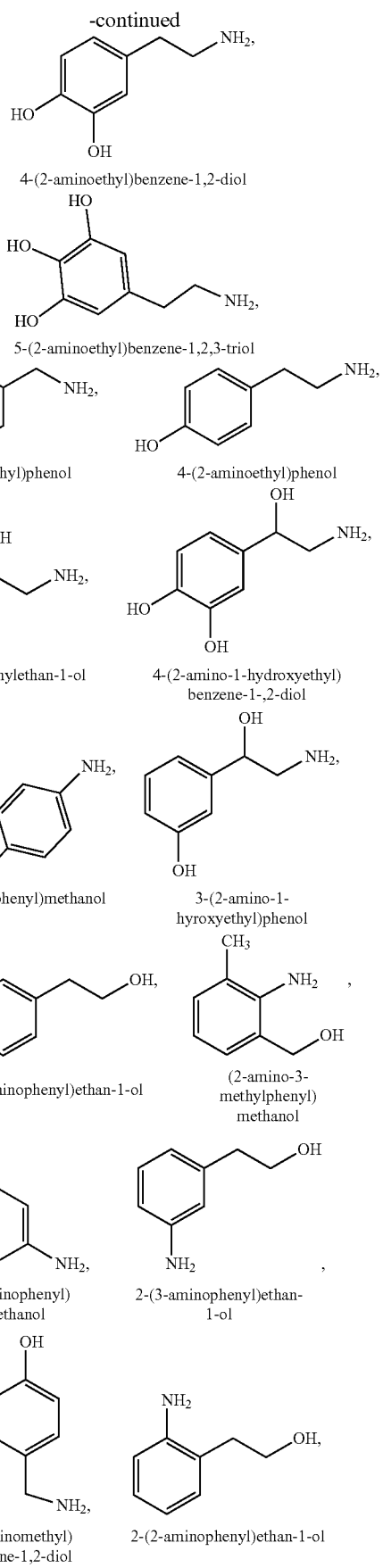

-continued

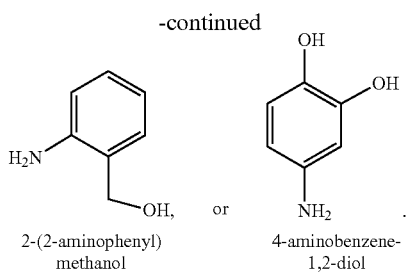

2-(2-aminophenyl) methanol   or   4-aminobenzene-1,2-diol

In some embodiments, the reaction product of the α-olefin/maleic anhydride copolymer and the amino-hydroxy compound comprises a structure selected from formula 1:

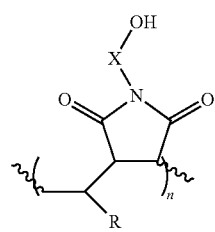

wherein R is a $C_8$ to $C_{36}$ alkyl group, X is a linking group, and n is selected from about 5 to about 200. In some embodiments, n is selected from 5 to 150, 5 to 100, 5 to 75, 5 to 50, 10 to 50, 10 to 75, 10 to 100, 10 to 150, or 10 to 200. In some embodiments, R is a $C_{10}$ to $C_{36}$ alkyl group, a $C_{12}$ to $C_{36}$ alkyl group, a $C_{14}$ to $C_{36}$ alkyl group, a $C_{16}$ to $C_{36}$ alkyl group, a $C_{18}$ to $C_{36}$ alkyl group, a $C_{20}$ to $C_{36}$ alkyl group, a $C_{22}$ to $C_{36}$ alkyl group, a $C_{24}$ to $C_{36}$ alkyl group, a $C_{26}$ to $C_{36}$ alkyl group, a $C_{28}$ to $C_{36}$ alkyl group, a $C_{30}$ to $C_{36}$ alkyl group, a $C_{32}$ to $C_{36}$ alkyl group, or a $C_{34}$ to $C_{36}$ alkyl group. The alkyl group may be substituted, unsubstituted, linear and/or branched.

Illustrative, non-limiting examples of linking groups include alkylene and arylene groups. Illustrative, non-limiting examples of linking groups include —$CH_2$—, —$CH_2CH_2$—, —$CH_2CH_2CH_2$—, —$CH_2CH_2(CH_3)$—, —$CH_2(CH_3)CH_2$—, —$CH_2CH_2NHCH_2CH_2$— and —$CH_2CH_2OCH_2CH_2$—.

Unless otherwise indicated, an alkyl group as described herein alone or as part of another group is an optionally substituted linear or branched saturated monovalent hydrocarbon substituent containing from, for example, one to about thirty-six carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylene) denote optionally substituted homocyclic aromatic groups, such as monocyclic or bicyclic groups containing from about 6 to about 12 carbons in the ring portion, such as phenyl, biphenyl, naphthyl, substituted phenyl, substituted biphenyl or substituted naphthyl. The term "aryl" also includes heteroaryl functional groups.

The term "substituted" as in "substituted alkyl," means that in the group in question (i.e., the alkyl group), at least one hydrogen atom bound to a carbon atom is replaced with one or more substituent groups, such as hydroxy (—OH), alkylthio, phosphino, amido (—$CON(R_A)(R_B)$, wherein $R_A$ and $R_B$ are independently hydrogen, alkyl, or aryl), amino (—$N(R_A)(R_B)$, wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—$OC(O)R_A$ wherein $R_A$ is alkyl or aryl), keto (—$C(O)R_A$ wherein $R_A$ is alkyl or aryl), heterocyclo, and the like.

When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The weight average molecular weight of the reaction product of the α-olefin/maleic anhydride copolymer and the amino-hydroxy compound is not particularly limited. In some embodiments, the reaction product comprises a weight average molecular weight from about 1,000 Da to about 100,000 Da.

For example, the reaction product of the α-olefin/maleic anhydride copolymer and the amino-hydroxy compound may comprise a weight average molecular weight from about 1,000 Da to about 80,000 Da, from about 1,000 Da to about 60,000 Da, from about 1,000 Da to about 40,000 Da, from about 1,000 Da to about 20,000 Da, from about 5,000 Da to about 80,000 Da, from about 5,000 Da to about 60,000 Da, from about 5,000 Da to about 40,000 Da, from about 5,000 Da to about 20,000 Da, from about 10,000 Da to about 80,000 Da, from about 10,000 Da to about 60,000 Da, from about 10,000 Da to about 40,000 Da, from about 20,000 Da to about 80,000 Da, from about 20,000 Da to about 60,000 Da, from about 20,000 Da to about 40,000 Da, or from about 30,000 Da to about 50,000 Da.

Amino-hydroxy compounds are bifunctional compounds and may react with the anhydride through both the amino- and the hydroxy-functionalities. The amine group is more nucleophilic than the hydroxyl group, will have higher reactivity, and will react with the anhydride under milder conditions as compared to hydroxy group. Three possible ring-opened products may be obtained from the reaction of the amino-hydroxy compound and the anhydride. An illustrative, non-limiting example is below. However, the amino-hydroxy compound is not limited to the one below and any amino-hydroxy compound may be used.

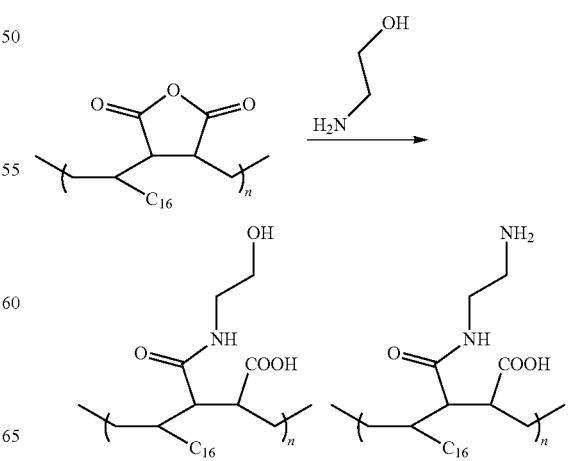

-continued

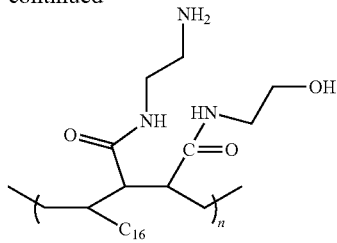

As can be seen, the reaction may produce a half amide-half acid structure

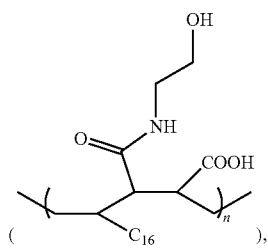

a half amide-half ester structure

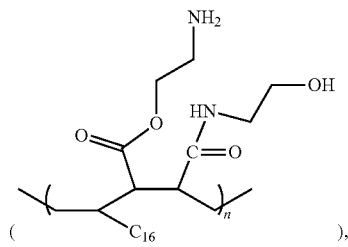

and/or a half acid-half ester structure

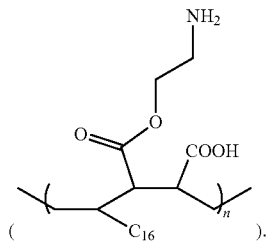

In certain embodiments, the reaction product of the present disclosure includes or excludes the half amide-half acid structure. In certain embodiments, the reaction product includes or excludes the half amide-half ester structure. In certain embodiments, the reaction product includes or excludes the half acid-half ester structure.

In accordance with certain embodiments of the present disclosure, the composition may comprise a solvent. The solvent may be selected from, for example, toluene, heavy aromatic naphtha, xylenes, a glycol, water, an alcohol, kerosene, propylene carbonate, paraffinic solvents, and any combination thereof.

In some embodiments, the alcohol may be selected from methanol, ethanol, isopropanol, 2-ethyl hexanol, benzyl alcohol, and any combination thereof. In some embodiments, the glycol may be ethylene glycol or a glycol ether, such as ethylene glycol monobutyl ether.

The compositions disclosed herein may include or exclude other additives. For example, the compositions may include or exclude corrosion inhibitors, viscosity reducers, friction reducers, scale inhibitors, clay swelling inhibitors, biocides, additional asphaltene dispersants, additional wax dispersants, flow back aids, emulsifiers, emulsion breakers, hydrogen sulfide scavengers, hydrate inhibitors, pH modifiers, surfactants, and/or other chemical treatment additives used in crude oil production, refining and chemical processing.

In some embodiments, a composition of the present disclosure may comprise from 0 to about 50 percent by weight of one or more of the additive(s), based on total weight of the composition. For example, a composition may comprise from about 0.01 wt. % to about 50 wt. %, from about 0.01 wt. % to about 40 wt. %, from about 0.01 wt. % to about 30 wt. %, from about 0.01 wt. % to about 20 wt. %, from about 0.01 wt. % to about 10 wt. %, from about 0.01 wt. % to about 5 wt. %, from about 0.01 wt. % to about 1 wt. %, from about 0.1 wt. % to about 50 wt. %, from about 0.1 wt. % to about 40 wt. %, from about 0.1 wt. % to about 30 wt. %, from about 0.1 wt. % to about 20 wt. %, from about 0.1 wt. % to about 10 wt. %, from about 0.1 wt. % to about 5 wt. %, from about 0.1 wt. % to about 1 wt. %, from about 0.5 wt. % to about 50 wt. %, from about 0.5 wt. % to about 40 wt. %, from about 0.5 wt. % to about 30 wt. %, from about 0.5 wt. % to about 20 wt. %, from about 0.5 wt. % to about 10 wt. %, from about 0.5 wt. % to about 5 wt. %, from about 0.5 wt. % to about 1 wt. %, from about 1 wt. % to about 50 wt. %, from about 1 wt. % to about 40 wt. %, from about 1 wt. % to about 30 wt. %, from about 1 wt. % to about 20 wt. %, from about 1 wt. % to about 30 wt. %, from about 1 wt. % to about 20 wt. %, from about 1 wt. % to about 10 wt. %, or from about 1 wt. % to about 5 wt. % of one or more additives.

In some embodiments, a composition of the present disclosure comprises from about 1 wt. % to about 100 wt. % of the reaction product of an α-olefin/maleic anhydride copolymer and an amino-hydroxy compound. For example, a composition may comprise from about 1 wt. % to about 90 wt. %, from about 1 wt. % to about 80 wt. %, from about 1 wt. % to about 70 wt. %, from about 1 wt. % to about 60 wt. %, from about 1 wt. % to about 50 wt. %, from about 1 wt. % to about 40 wt. %, from about 1 wt. % to about 30 wt. %, from about 1 wt. % to about 20 wt. %, from about 1 wt. % to about 10 wt. %, from about 5 wt. % to about 10 wt. %, from about 5 wt. % to about 20 wt. %, from about 5 wt. % to about 30 wt. %, from about 5 wt. % to about 40 wt. %, from about 5 wt. % to about 50 wt. %, from about 5 wt. % to about 60 wt. %, from about 5 wt. % to about 70 wt. %, from about 5 wt. % to about 80 wt. %, from about 5 wt. % to about 90 wt. %, from about 10 wt. % to about 90 wt. %, from about 10 wt. % to about 80 wt. %, from about 10 wt. % to about 70 wt. %, from about 10 wt. % to about 60 wt. %, from about 10 wt. % to about 50 wt. %, from about 10 wt. % to about 40 wt. %, from about 10 wt. % to about 30 wt. %, from about 20 wt. % to about 60 wt. %, from about 30 wt. % to about 60 wt. %, or from about 40 wt. % to about 60 wt. % of the reaction product.

In some embodiments, the compositions disclosed herein exclude an alkylphenol compounds and/or alkylphenol alkoxylates.

The foulant dispersants disclosed herein are thermolytically stable under conditions commonly employed or encountered within hydrocarbon process streams. Thus, they may be suitably added to one or more hydrocarbon processing streams prior to subjecting the processing stream to one or more thermolytically challenging processes, such as hydrotreating. The foulant dispersants retain their antifouling properties during hydrocarbon processing at temperatures of about 20° C. to about 400° C. Further, the foulant dispersants are hydrolytically stable (not susceptible to hydrolysis) and therefore are suitable for use in hydrocarbon processing streams contaminated with water, such as about 1 wt. % or less of water.

Dispersions, such as stable dispersions, comprising the presently disclosed compositions are also provided herein. The dispersions comprise a hydrocarbon, the reaction product of an α-olefin/maleic anhydride copolymer and an amino-hydroxy compound disclosed herein, any solvent disclosed in, or contemplated by, the present disclosure, and a foulant.

In some embodiments, the dispersion comprises from about 1 ppm to about 10,000 ppm of the reaction product. For example, the dispersion may comprise from about 1 ppm to about 8,000 ppm, from about 1 ppm to about 6,000 ppm, from about 1 ppm to about 4,000 ppm, from about 1 ppm to about 2,000 ppm, from about 1 ppm to about 1,000 ppm, from about 1 ppm to about 500 ppm, from about 1 ppm to about 250 ppm, from about 1 ppm to about 100 ppm, from about 100 ppm to about 8,000 ppm, from about 100 ppm to about 6,000 ppm, from about 100 ppm to about 4,000 ppm, from about 100 ppm to about 2,000 ppm, from about 100 ppm to about 1,000 ppm, from about 100 ppm to about 500 ppm, from about 100 ppm to about 250 ppm, from about 500 ppm to about 8,000 ppm, from about 500 ppm to about 6,000 ppm, from about 500 ppm to about 4,000 ppm, from about 500 ppm to about 2,000 ppm, or from about 500 ppm to about 1,000 ppm of the reaction product.

In some embodiments, the dispersion may comprise from about 1 ppm to about 10,000 ppm of the solvent. For example, the dispersion may comprise from about 1 ppm to about 8,000 ppm, from about 1 ppm to about 6,000 ppm, from about 1 ppm to about 4,000 ppm, from about 1 ppm to about 2,000 ppm, from about 1 ppm to about 1,000 ppm, from about 1 ppm to about 500 ppm, from about 1 ppm to about 250 ppm, from about 1 ppm to about 100 ppm, from about 100 ppm to about 8,000 ppm, from about 100 ppm to about 6,000 ppm, from about 100 ppm to about 4,000 ppm, from about 100 ppm to about 2,000 ppm, from about 100 ppm to about 1,000 ppm, from about 100 ppm to about 500 ppm, from about 100 ppm to about 250 ppm, from about 500 ppm to about 8,000 ppm, from about 500 ppm to about 6,000 ppm, from about 500 ppm to about 4,000 ppm, from about 500 ppm to about 2,000 ppm, or from about 500 ppm to about 1,000 ppm of the solvent.

The amount of foulant in the dispersion will depend on a number of factors, such as the type of hydrocarbon and origin of the hydrocarbon. For example, crude oil generally comprises from about 10 wt. % to about 70 wt. % wax. Additionally, crude oil generally comprises about 0 wt. % to about 50 wt. % of asphaltenes.

The dispersions disclosed herein may be present and stable at temperatures ranging from about 20° C. to about 400° C.

The present disclosure also provides methods of manufacturing the foulant dispersants. In some embodiments, the synthesis includes free-radical polymerization of maleic anhydride with an α-olefin to produce an α-olefin maleic anhydride copolymer and condensation of the copolymer with an amino alcohol to form a hydroxy-succinimide copolymer.

In an illustrative, non-limiting example, an α-olefin/maleic anhydride copolymer (3) (OMAC) is synthesized by reacting the α-olefin (1) with maleic anhydride (2) using conventional techniques, e.g., radical addition polymerization principles and techniques familiar to those skilled in the art of polymer synthesis (Scheme 1). The synthesis of such precursor polymers is also described in Comer et al., U.S. Pat. No. 5,214,224, which is expressly incorporated by reference into the present application.

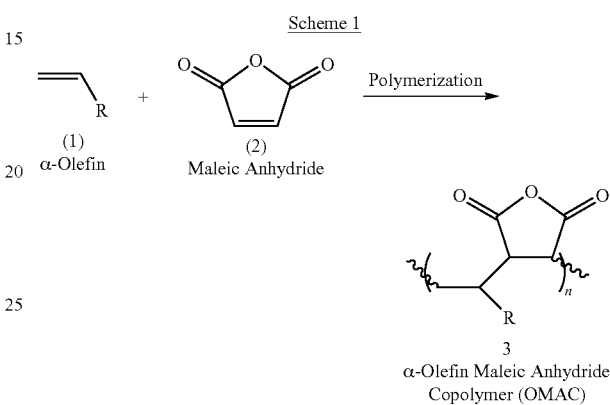

Scheme 1

(1) α-Olefin
(2) Maleic Anhydride
(3) α-Olefin Maleic Anhydride Copolymer (OMAC)

The copolymer may comprise a mole ratio of α-olefin to maleic anhydride ranging from, for example, 1:5 to 5:1. The weight average molecular weight of the copolymer may be from about 5,000 Da to about 300,000 Da, such as about 100,000 Da, for example, when analyzed by gel permeation chromatography (GPC).

The copolymer (3) is then reacted with an amino-hydroxy compound (4) to form the foulant dispersant (5).

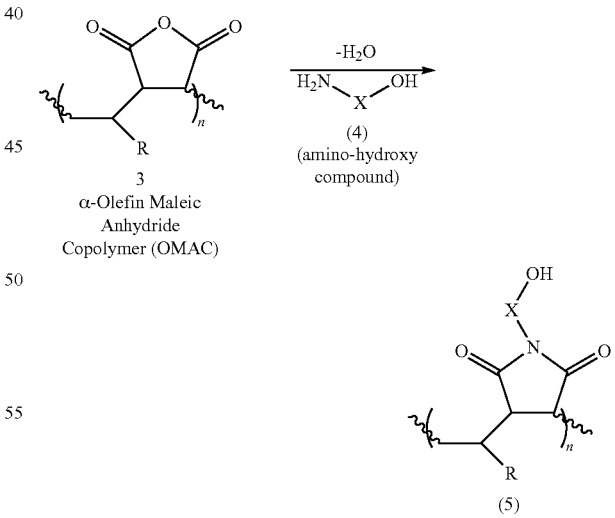

(3) α-Olefin Maleic Anhydride Copolymer (OMAC)
(4) (amino-hydroxy compound)
(5)

The reaction may be carried out at temperatures between about 100° C. and about 180° C. to provide hydroxy-containing succinimide in the backbone via water molecule elimination. For example, the reaction may be carried out at temperatures between about 120° C. and about 180° C., between about 140° C. and about 180° C., or between about 160° C. and about 180° C.

The amino-hydroxy compound could be any compound that comprises an amino group and a hydroxy group. For example, the amino-hydroxy compound can be any acylic or cyclic aliphatic amino-hydroxy compound herein or any aromatic amino-hydroxy compound disclosed herein. The reaction may be carried out using a molar ratio of amine moieties to anhydride moieties of, for example, about 1:1. The reaction is carried out in a solvent, such as a petroleum solvent (e.g., paraffinic solvents, mineral oil, "HAN" or heavy aromatic naphtha/Aromatic 150, any mixture thereof, and the like.

The present disclosure additionally provides methods of dispersing foulants in hydrocarbons. While carrying out the methods, the compositions disclosed herein may be applied to hydrocarbon process streams batch-wise, continuously, or semi-continuously. In some embodiments, the application of the composition is manual and in other embodiments, the application is automated. The amount of the composition applied over a selected unit of time may vary.

In some embodiments, the hydrocarbon present in the one or more hydrocarbon process streams is crude oil, reduced crude oil, crude distillate, heavy oil, bitumen, coker charge, hydrotreater influent, flashed crude, light cycle oil, or a diesel or naphtha refinery stream. In some embodiments, the hydrocarbon process equipment is any equipment conventionally associated with the collecting, processing, transportation, or storage of one or more of crude oil, reduced crude oil, crude distillate, heavy oil, bitumen, coker charge, hydrotreater influent, flashed crude, light cycle oil, or a diesel or naphtha refinery stream, including pipes and associated infrastructure used to fluidly connect process equipment items together to facilitate processing of a process stream disposed therein.

The treated process streams, which may be treated liquid hydrocarbon products disposed in fluid contact with an interior surface of hydrocarbon processing equipment, result in reduction or elimination of fouling of the contacted interior surface. In some embodiments, the treated process streams undergo 50% to 100% reduction in fouling compared to the corresponding process stream (that is, the untreated process stream), or about 60% to 100%, or about 70% to 100%, or about 80% to 100%, or about 90% to 100%, or about 95% to 100% reduction in measurable fouling of the interior surfaces of hydrocarbon process equipment compared to the corresponding process stream.

The percent reduction in fouling may be determined by, for example, the following test. A selected volume of treated liquid hydrocarbon product is added to hexane or heptane to form a 1% to 100% solution of the hydrocarbon product, and the diluted product is allowed to stand for 2 hours at about 20° C. Precipitate that forms is then measured volumetrically and reported as a percentage of the precipitate observed in the control sample, which is the corresponding untreated hydrocarbon product. Fouling may be measured as a relative increase in retention of solids within the treated hydrocarbon product compared to the retention of solids in untreated hydrocarbon product over the same time-period. Fouling may also be measured as a relative decrease in the weight or volume of precipitate arising from a selected period of contact of a treated hydrocarbon process stream in an associated hydrocarbon process equipment item, relative to the same period of contact of the hydrocarbon process equipment with the corresponding untreated hydrocarbon process stream. Stated differently, a reduction in fouling is a relative decrease in the measured weight or volume of solids deposited on, or precipitated from, hydrocarbon process equipment contacted with the treated hydrocarbon process stream over a selected period of time, when compared to the weight or volume of solids deposited or precipitated from an untreated hydrocarbon process stream over the same period of time.

In some embodiments, the treated hydrocarbon process stream (the stream having the composition added thereto) is disposed within a hydrocarbon process apparatus, the apparatus comprising an interior surface, such as a surface comprising a metal, wherein the treated hydrocarbon stream is in fluid contact with the surface.

In some embodiments, the composition is introduced into crude oil by injecting the composition beneath the surface into an oil well, by injecting into the crude oil at the well-head, or by injecting into the crude oil process stream at a point between the well-head and the final oil storage tank. The composition may be injected continuously or in batch fashion, for example. The injecting is generally accomplished using electric or gas pumps.

Furthermore, when the composition is to be applied as a wax dispersant, a method for reducing wax deposition may be carried out. The method may reduce wax deposition in a crude oil storage or transportation vessel, for example. The method may comprise adding the composition to the crude oil in an amount effective to reduce wax deposition in the storage or transportation vessel containing the crude oil.

In some embodiments, the crude oil consists essentially of crude oil of any API gravity such that it does not include any significant amount, or any amount, of a refined hydrocarbon product, such as a distillate (e.g., a cold flow distillate, or a diesel fuel).

The storage or transportation vessel can be any vessel used to store or transport a crude oil, including, but not limited to, a storage tank, rail car, tank truck, marine vessel, barge, or pipeline. In some embodiments, the composition can be added to a crude oil contained in a storage tank, rail car, or tank truck.

The amount of foulant dispersant added depends on certain factors, such as the particular hydrocarbon being treated. In general, the effective amount of the foulant dispersant ranges from about 1 ppm to about 10,000 ppm, based on volume of the oil. For example, the effective amount may be from about 1 ppm to about 8,000 ppm, from about 1 ppm to about 6,000 ppm, from about 1 ppm to about 4,000 ppm, from about 1 ppm to about 2,000 ppm, from about 1 ppm to about 1,000 ppm, from about 1 ppm to about 500 ppm, from about 1 ppm to about 250 ppm, from about 1 ppm to about 100 ppm, or from about 1 ppm to about 50 ppm, based on volume of the oil.

In some embodiments, when being applied as an asphaltene dispersant, the effective amount may be from about 1 ppm to about 1,000 ppm, although the amounts noted in the foregoing paragraph may be used as well. In some embodiments, when being applied as a wax dispersant, the effective amount may be from about 1 ppm to about 5,000 ppm, although the amounts noted in the foregoing paragraph may be used as well.

The foregoing may be better understood by reference to the following examples, which are intended for illustrative purposes and are not intended to limit the scope of the disclosure or its application in any way.

EXAMPLES

The following is a representative synthetic scheme for Polymer 1.

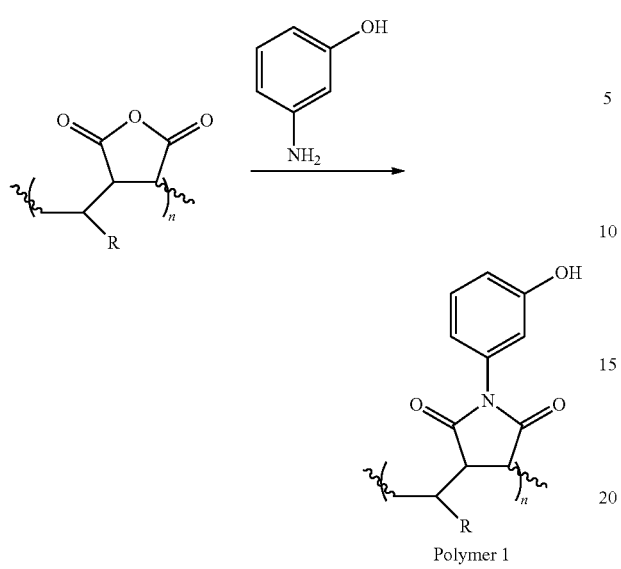

Polymer 1

A copolymer of $C_{24}$-$C_{28}$ α-olefin with maleic anhydride (CAS No. 68459-79-0), having a molar ratio of amine moieties to anhydride moieties of about 1:1, was obtained according to the procedures outlined in U.S. Pat. No. 5,214,224.

Table 1 shows the reagents and amounts were used in the reaction. The molar ratio of maleic anhydride residues in the backbone to 3-Aminophenol used in this reaction was about 1:1.

TABLE 1

| Reagent | Amount (g) |
| --- | --- |
| $C_{24}$-$C_{28}$ α-Olefin Maleic Anhydride Copolymer | 14.4 |
| Heavy Aromatic Naphtha (HAN) | 82 |
| 3-Aminophenol | 3.6 |

To a 250 mL four-necked round-bottom flask equipped with a temperature probe, nitrogen inlet, Dean-Stark apparatus, condenser and magnetic stir bar was added $C_{24}$-$C_{28}$ α-olefin maleic anhydride copolymer (about 14.4 g). The polymer was then diluted in about 82 g of HAN and the temperature was increased to about 65° C. 3-aminophenol was then charged to the well-stirred reaction mixture. The temperature of the reaction mixture was observed to rise to about 80° C. The resulting suspension was heated to about 160° C. under a nitrogen blanket and stirred for about 6 hours or until completion of the reaction. As the reaction proceeded to completion, the suspension was converted to a homogenous product. The resulting product was characterized by NMR and IR techniques. No peaks associated with anhydride or imide groups were observed in the final products.

Using the general synthesis described above, the polymers listed in Table 2 were synthesized starting from $C_{24}$-$C_{28}$ a-olefin maleic anhydride copolymer and the corresponding amino-hydroxy compounds.

TABLE 2

| Polymer | Amino-hydroxy compound | Structures |
| --- | --- | --- |
| Polymer 1 | 3-Aminophenol | 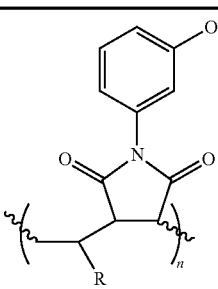 |
| Polymer 2 | 4-Aminophenol | 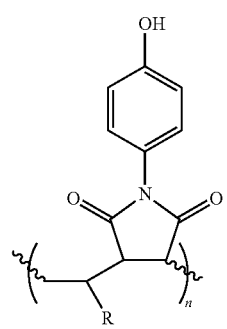 |
| Polymer 3 | 2-(2-aminoethylamino)ethanol (2AEAE) | 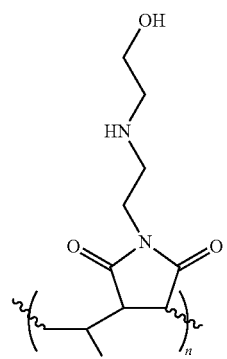 |
| Polymer 4 | Ethanolamine | 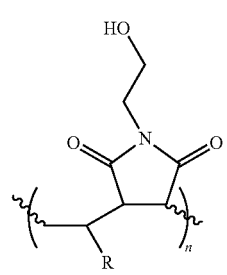 |

Polymers 1, 2, 3 and 4 were screened for effectiveness as asphaltene dispersants. In the tests, a predetermined volume of crude oil was dissolved in n-heptane or n-hexane, an environment that encourages asphaltene precipitation. The efficiency of each asphaltene stabilizer was observed by comparing the volume of sediment formed in each tube after two hours of quiescent settling. More efficient dispersants will result in lower volumes of sediment.

The asphaltene dispersant test (ADT) is widely used to screen and evaluate asphaltene dispersants in the oil and gas industry. The procedure is used for comparing the asphaltene content of crude oils and evaluating the ability of asphaltene dispersant to disperse asphaltenes within such oils. The basis of the asphaltene dispersant test is to determine relative effectiveness of dispersants in keeping asphaltenes dispersed in a non-solvent medium.

The ADT takes advantage of the insolubility of asphaltenes in alkane diluent (e.g., a paraffinic organic solvent, such as heptane). Dilution of a fixed volume of asphaltenic material (such as crude oil) in a fixed volume of alkane diluent results in precipitation of asphaltenes. Dilution of the same fixed volume of asphaltenic material properly dosed with dispersant in the same fixed volume of alkane diluent results in minimal precipitation of asphaltenes during a controlled testing period.

An effective dispersant prevents the agglomeration and eventual precipitation of asphaltenes when the sample is diluted in alkane diluent. Thus, the desired result is low to no precipitation of the asphaltene materials and the samples having the least deposition (most dispersion) of these materials show the best results. Precipitation as measured by this procedure is predictive of relative fouling behavior in petroleum process streams.

Equipment used in the experiments included 10-15 mL graduated, conical centrifuge tubes, a timer, and a lightbox and/or flashlight for ease of viewing precipitate present in darker petroleum liquids. Centrifuge tubes were charged with a pre-determined volume of crude oil. The tubes were then charged with a specified amount of dispersant. One tube served as a blank and remained untreated. 10 mL of n-heptane was added to each centrifuge tube and each tube was thoroughly mixed to be sure that all of the oil was dispersed. When all of the tubes were sufficiently blended, the tubes were placed in a test tube rack in front of a bright light. After two hours of quiescent settling, the relative volumes of sediment in each tube were recorded.

In a first series of tests, Polymers 1-3 were compared to two prior art dispersants. The ADT conditions were as follows:
Crude Oil A: 20.3° API Gravity
Crude Oil volume: 100 µL
Dispersant dosage: 10 ppm actives
Paraffinic solvent:10 ml n-heptane
Test duration: 2 h The data is presented below in Table 3, which shows sediment volumes.

TABLE 3

| Sample ID | OMAC backbone | Amine | Sediment volume (ml) |
|---|---|---|---|
| Polymer 1 | $C_{24\text{-}28}$ OMAC | 3-Aminophenol | 0 |
| Polymer 2 | $C_{24\text{-}28}$ OMAC | 4-Aminophenol | <0.1 |
| Polymer 3 | $C_{24\text{-}28}$ OMAC | 2-(2-aminoethylamino)ethanol | 0 |
| Prior Art 1 | Polyisobutylene succinate chemistry | | 0 |
| Prior Art 2 | Nonylphenol formaldehyde resin | | 0 |
| Blank | No dispersant chemistry added | | 3 |

In a second series of tests, the asphaltene dispersant performance of Polymers 1-3 and 5-7 was compared with two prior art dispersants. The ADT conditions were as follows:
Crude Oil tested: 36.1° API Gravity
Crude Oil volume: 500 µL
Dispersant dosage: 5 ppm actives
Paraffinic solvent:10 ml n-heptane
Test duration: 2 h The data is present below in Table 4, which shows sediment volumes.

TABLE 4

| Sample ID | OMAC backbone | Amine | Sediment volume (ml) |
|---|---|---|---|
| Polymer 1 | $C_{24\text{-}28}$ OMAC | 3-Aminophenol | 0 |
| Polymer 2 | $C_{24\text{-}28}$ OMAC | 4-Aminophenol | 0 |
| Polymer 3 | $C_{24\text{-}28}$ OMAC | 2-(2-aminoethylamino)ethanol | 0 |
| Polymer 5 | $C_{18}$ OMAC | 3-Aminophenol | 0 |
| Polymer 6 | $C_{18}$ OMAC | 4-Aminophenol | 0.4 |
| Polymer 7 | $C_{18}$ OMAC | 2-(2-aminoethylamino)ethanol | 0 |
| Prior Art 1 | Polyalkenyl succinate chemistry | | 0 |
| Prior Art 2 | Nonylphenol formaldehyde resin | | 0 |
| Blank | No dispersant chemistry added | | 2.6 |

In a third test, the asphaltene dispersant performance of Polymer 4 was evaluated in three different crude oils. The ADT conditions were as follows:
Crude Oil tested: 19.2, 24.8, and 31.0° API crude oil
Crude Oil volume: 50-200 µL
Dispersant dosage: 10 ppm actives
Paraffinic solvent:10 ml n-heptane
Test duration: 2 h The data is present below in Table 5, which shows sediment volumes.

TABLE 5

| Example | Chemical Structure | OMAC backbone | Amine | Crude Oil | uL of Oil | Sediment volume (mL) |
|---|---|---|---|---|---|---|
| 1 | Blank | — | | 19.2° API | 50 | 0.5 |
| 2 | Polymer 4 | $C_{24\text{-}28}$ OMAC | 2-aminoethan-1-ol | 19.2° API | 50 | <0.1 |
| 3 | Blank | — | | 24.8° API | 50 | 0.3 |
| 4 | Polymer 4 | $C_{24\text{-}28}$ OMAC | 2-aminoethan-1-ol | 24.8° API | 50 | <0.1 |
| 5 | Blank | — | | 31.0° API | 200 | 0.8 |
| 6 | Polymer 4 | $C_{24\text{-}28}$ OMAC | 2-aminoethan-1-ol | 31.0° API | 200 | <0.1 |

In a final test, wax dispersant properties were evaluated. Crude oil and heavy oils contain long chain paraffins typically ranging from $C_{10}$-$C_{60}$. When the oils are cooled below their wax appearance temperature, the paraffins crystallize from the oil to form wax. The wax increases the oil's viscosity and pour point. This leads to a decreased pumping rate and wax deposition problems when oils are being pumped through a pipeline. Pour point depressants/wax dispersants are materials used to lower the pour point and viscosity of crude oils. These compounds interact with the paraffins in the oil to decrease wax crystal size and prevent wax crystal agglomeration.

The ASTM D5950 pour point test is a method to assess the lowest temperature at which a crude oil will flow. The efficacy of pour point depressants can also be evaluated. The pour point tests were conducted using the PAC instruments OptiCPP. The oil was preheated to about 52° C. prior to the test.

A vacuum gas oil was heated to about 52° C. and treated with 1,000 ppm of 49 wt. % $C_{24}$-$C_{28}$ α-olefin maleic anhydride copolymer condensed with 2-aminoethan-1-ol. As seen in the data presented in Table 6, the polymer was able to reduce the pour point of the oil from 33° C. to 6° C., clearly showing the efficacy of these compounds as pour point depressants.

TABLE 6

| Example | OMAC backbone | Amine | Dose Rate (ppm) | ASTM D5950 Pour Point (° C.) |
|---|---|---|---|---|
| 1 | — | — | — | 33 |
| 2 | $C_{24-28}$ OMAC | 2-aminoethan-1-ol | 1,000 | 6 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a dispersant" is intended to include "at least one dispersant" or "one or more dispersants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of dispersing a foulant in a hydrocarbon, comprising:
    adding a composition to the hydrocarbon, wherein the composition comprises an effective amount of a reaction product of an α-olefin/maleic anhydride copolymer and an amino-hydroxy compound, and dispersing the foulant;
    wherein the amino-hydroxy compound is a cyclic aliphatic compound, an acyclic aliphatic compound, or an aromatic compound of formula

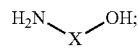

and
    wherein the reaction product comprises a structure of Formula I:

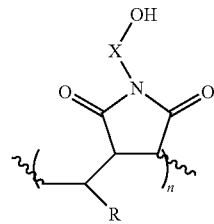

wherein R is a $C_8$ to $C_{36}$ alkyl group, n is from about 5 to about 200, and X is a linking group.

2. The method of claim 1, wherein the cyclic aliphatic compound is selected from

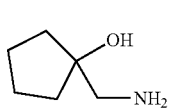
1-(aminomethyl)cyclopentan-1-ol,  4-aminocyclohexan-1-ol , or

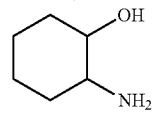
2-aminocyclohexan-1-ol.

3. The method of claim 1, wherein the acyclic aliphatic compound is selected from

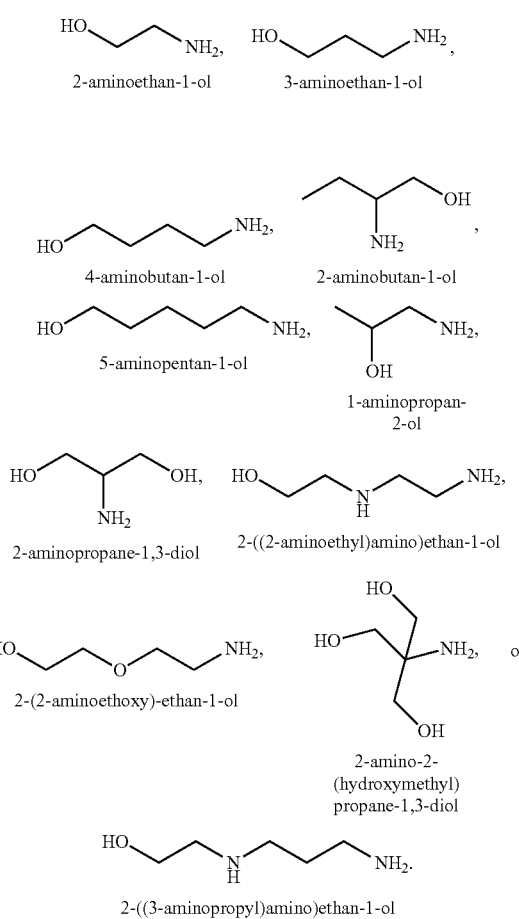

4. The method of claim 1, wherein the aromatic compound is selected from

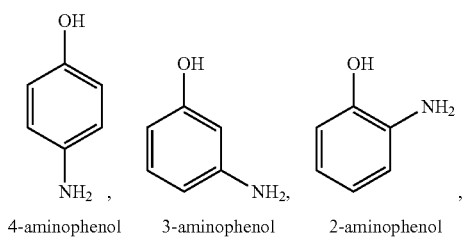

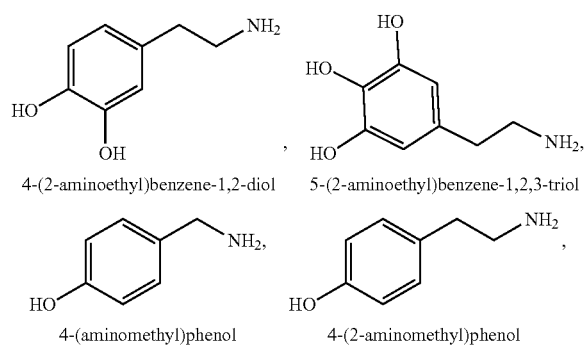

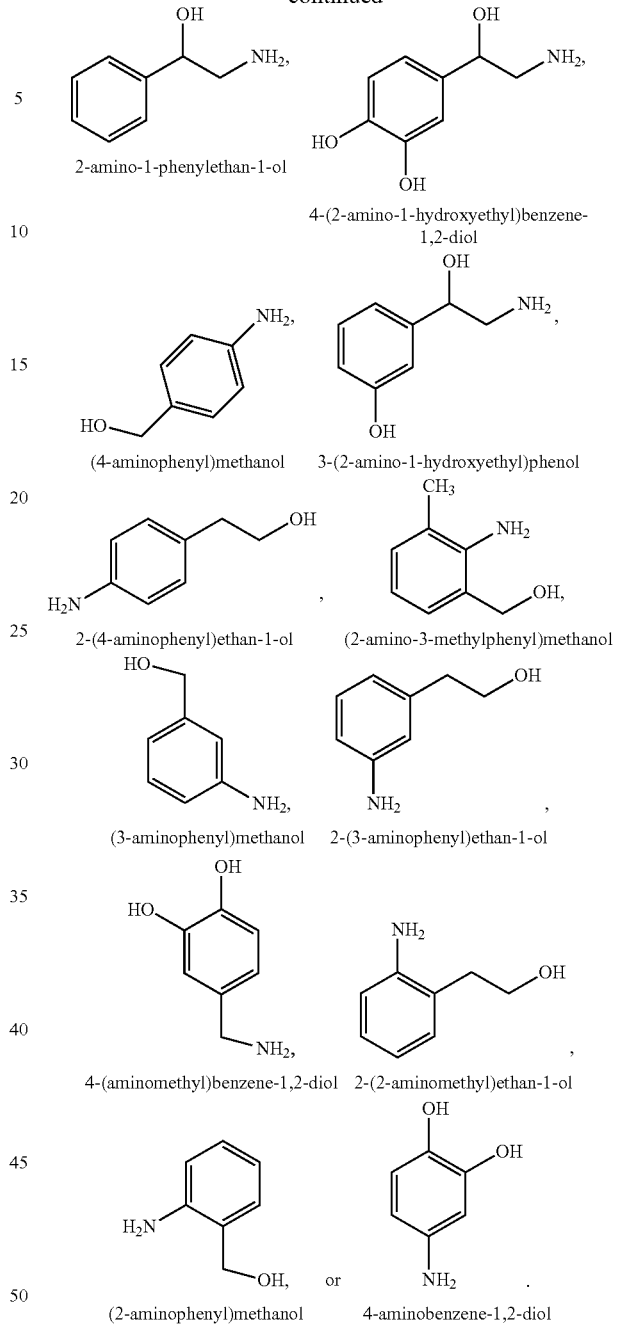

5. The method of claim 1, wherein the foulant comprises an asphaltene and/or a wax.

6. The method of claim 1, wherein the composition is added continuously or intermittently to the hydrocarbon.

7. The method of claim 1, wherein the hydrocarbon comprises crude oil.

8. The method of claim 1, wherein the effective amount of the reaction product is from about 1 ppm to about 10,000 ppm, based on volume of the hydrocarbon.

9. The method of claim 1, wherein the composition comprises from about 1 wt. % to about 100 wt. % of the reaction product.

10. The method of claim 1, wherein the reaction product comprises a weight average molecular weight from about 1,000 Da to about 100,000 Da.

11. The method of claim 1, wherein X is an alkylene group, an arylene group, —CH$_2$CH$_2$NHCH$_2$CH$_2$— or —CH$_2$CH$_2$OCH$_2$CH$_2$—.

12. The method of claim 1, wherein the composition comprises a solvent selected from the group consisting of toluene, heavy aromatic naphtha, xylenes, a glycol, water, an alcohol, ethylene glycol, ethylene glycol monobutyl ether, kerosene, propylene carbonate, a glycol ether, and any combination thereof.

13. The method of claim 1, wherein the composition excludes an alkylphenol and/or an alkylphenol alkoxylate or wherein an alkylphenol and/or an alkylphenol alkoxylate is not added to the hydrocarbon.

14. A dispersion, comprising:
a hydrocarbon,
a reaction product of an a-olefin/maleic anhydride copolymer and an amino-hydroxy compound,
a solvent, and
a foulant;
wherein the amino-hydroxy compound is a cyclic aliphatic compound, an acyclic aliphatic compound, or an aromatic compound of formula

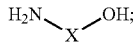

and
wherein the reaction product comprises a structure of Formula I:

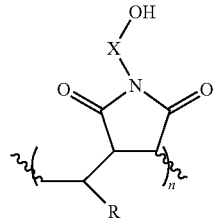

wherein R is a C$_8$ to C$_{36}$ alkyl group, n is from 5 to 200, and X is a linking group.

15. The dispersion of claim 14, wherein the dispersion excludes an alkylphenol and/or an alkylphenol alkoxylate.

16. The dispersion of claim 14, wherein the reaction product does not comprise an acid group and/or wherein the dispersion does not comprise a compound having an acid group.

17. The dispersion of claim 14, wherein the foulant comprises an asphaltene and/or a wax.

18. The dispersion of claim 14, wherein the hydrocarbon comprises crude oil.

19. The dispersion of claim 18, wherein the crude oil does not include any significant amount, or any amount, of a refined hydrocarbon product, such as a distillate.

20. A method of dispersing a foulant in a crude oil, comprising:
adding a composition to the crude oil, wherein the composition comprises an effective amount of a reaction product of an α-olefin/maleic anhydride copolymer and an amino-hydroxy compound, and
dispersing the foulant;
wherein the reaction product comprises a structure of Formula I:

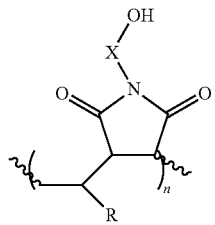

wherein R is a C$_8$ to C$_{36}$ alkyl group, n is from about 5 to about 200, and X is a linking group.

* * * * *